J. H. McINTIRE.

Improvement in Links.

No. 121,725.                                    Patented Dec. 12, 1871.

Witnesses.                                      Inventor.

125,725

UNITED STATES PATENT OFFICE.

JOSEPH H. McINTIRE, OF CRESTLINE, OHIO.

IMPROVEMENT IN LINKS.

Specification forming part of Letters Patent No. 121,725, dated December 12, 1871.

*To all whom it may concern:*

Be it known that I, JOSEPH H. MCINTIRE, of Crestline, in the county of Crawford and State of Ohio, have invented a certain new and useful Improvement in Links; and I do hereby declare the following to be a full, clear, and exact description thereof, reference being had to the accompanying drawing forming a part of the same, and in which—

Figure 1:
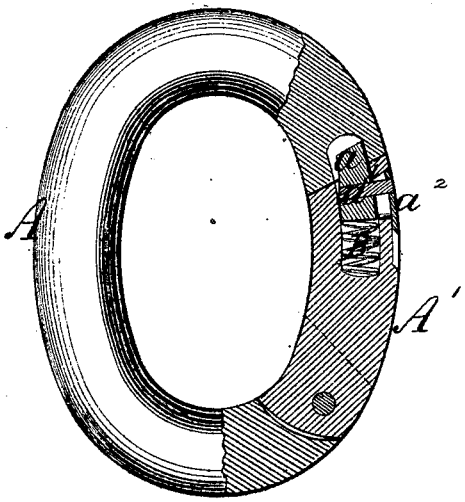
Figure 2:
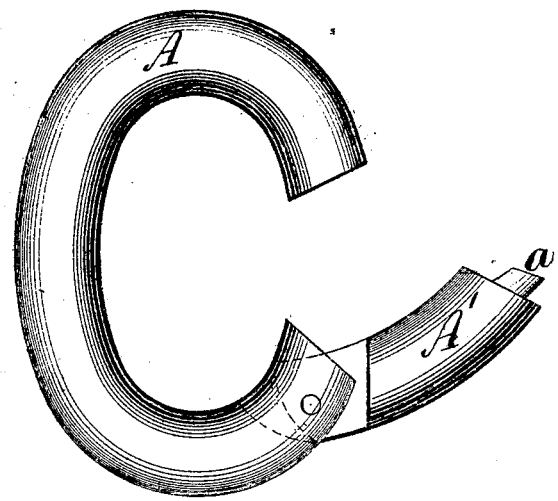

Figure 1 represents a view of my improved link partly in section and partly in side view, and Fig. 2 is a plan view of the same with its hinged portion thrown out.

Similar letters of reference in the two figures refer to like parts.

This invention has reference to an improvement in links; and it consists of an ordinary link constructed in two parts, which parts are hinged and held together substantially in the manner and for the purpose hereinafter described and claimed.

To enable others to make and use my invention, I will proceed to describe it.

A A', in the drawing, refer to a link, the portion A' of which is hinged to the part A by being formed with a tongue, which fits within a recess cut in the latter, as plainly shown in the drawing, and having a pin passing through an aperture made in said tongue and apertures made in the walls of the said recess. The hinged portion A' of the link is made hollow or supplied with a cylindrical chamber or recess, within which is inserted a bolt, $a$, having an upright projection, $a^1$, to which a horizontal plate, $a^2$, is attached. The projection $a^1$ extends up through an elongated opening or slot cut in the part A', so as to permit of it having backward and forward or endwise movement for the purpose of allowing its bolt $a$ having a similar motion imparted to it, whereby, when the said projection or its plate $a^2$ is pushed backward, the said bolt may be thrown into its recess or chamber, disengaging it from contact with the part A of the link, and pressure relieved from the said plate. The bolt may be permitted to be thrown out of its chamber by means of a spring, B, causing it, the bolt, to engage with the said part A of the link, and thereby hold the part A' firmly to the part A. B refers to a spiral spring placed in the chamber of and in rear of the bolt $a$ for throwing the said bolt out of its chamber and holding it firmly in contact with the part A of the link, the said part being supplied with a recess to receive the projecting end of the said bolt, as plainly shown in Fig. 1.

Having thus described my invention, what I claim, and desire to secure by Letters Patent, is—

The link A A', supplied with the fastening consisting of the bolt $a$, upright projection $a^1$, and horizontal plate $a^2$, constructed and arranged to operate substantially as shown and described, and for the purpose set forth.

In testimony that I claim the foregoing as my invention I have hereunto signed my name this 1st day of August, A. D. 1871, in presence of two subscribing witnesses.

JOSEPH H. McINTIRE.

Witnesses:
    D. BABET, Jr.,
    WALLACE STAHLE. (23)